Dec. 22, 1959   J. E. FOX, JR   2,918,331
FEEDER
Filed July 14, 1958
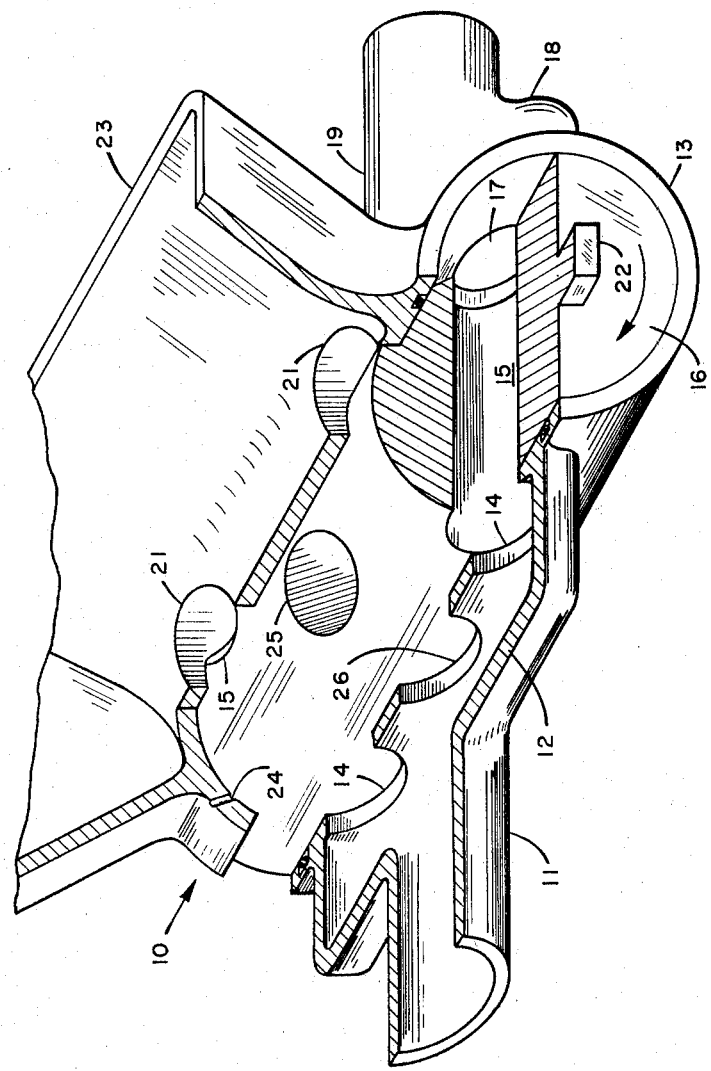
JAMES E. FOX, JR
INVENTOR.
BY *L. C. Goodwin*
ATTORNEY

United States Patent Office 2,918,331
Patented Dec. 22, 1959

2,918,331
FEEDER

James E. Fox, Jr., Fort Worth, Tex., assignor to Pan American Petroleum Corporation, Tulsa, Okla., a corporation of Delaware Application July 14, 1958, Serial No. 748,195

6 Claims. (Cl. 302—49)

This invention relates to an apparatus for feeding solids into a fluid stream. More particularly, this invention pertains to a mechanism for injecting solids, particularly solids which stick together or pack, into a high-pressure liquid or gas stream.

Many types of bulk feeders have been developed for injecting solids into a mixing chamber as a stream of fluid. These bulk feeders generally perform satisfactorily where the solids are not too soft or sticky and where the pressure of the fluid into which the solid is injected is not too high. I have found, however, that in feeding relatively soft and compressible sticky solids; particularly finely divided solids such as granulated soaps, detergents and other surface-active agents, granulated desiccants, and the like, into a stream of high-pressure fluid,, most of these solids tend to become packed in the measuring or proportioning compartment of the feeder when the solids are subjected to the pressure of the fluid and the feeder soon becomes inoperable for the intended purpose.

It is, therefore, an object of this invention to provide an improved bulk solids feeder. It is a more specific object of this invention to provide an apparatus for feeding bulky compressible or sticky solids into a high-pressure fluid stream. It is still a more specific object of this invention to provide a bulk solids feeder in which a compartment is first filled at low pressure. The filled compartment is then subjected to the pressure of the fluid and the high-pressure fluid is passed through the measuring compartment or pockets and purges the solids therefrom. Other objects of this invention will become apparent from the following description in which reference will be made to the accompanying drawing. The drawing is an isometric view, partially cut away and cross-sectioned, of a preferred embodiment of a feeder as it is disposed in a line carrying a flowing fluid under pressure.

In brief, this invention may be described as a bulk feeder which is particularly adapted for injecting sticky or compressible granular solids into a stream of a high-pressure fluid such as an air stream used in air drilling oil and gas wells. The solids are first loaded into a low-pressure hopper. From the hopper the solids flow by gravity into a feeder pocket or compartment which is then rotated into the flowing fluid stream and fluid is forced through the compartment to purge the solids therefrom.

Referring now to the drawing for a more detailed description of a preferred embodiment of this invention, the feeder 10 is disposed in a high-pressure line carrying a fluid such as gas. The fluid inlet line 11 which is typically connected to the discharge of a pump or a gas compressor (not shown) is attached to the feeder inlet header 12. This inlet header is fixed to a cylindrical housing 13. One or more fluid inlet ports 14 through the wall of housing 13 admit fluid from the inlet header to one or more pockets or compartments for the solids, hereinafter referred to as receptacles 15, which are holes in rotor 16. These holes ae desirably perpendicular to and through the axis of the rotor. The rotor is closely fitted in housing 13 and forms a fluid seal therewith to prevent loss of fluid or bypassing of the fluid around the rotor and between the various ports in the housing. When the inlet end of a receptacle 15 is in register with its fluid inlet port 14, the outlet of the receptacle is also in register with a fluid outlet port 17 in the wall of housing 13 diametrically opposed to the fluid inlet port. The fluid outlet port discharges fluid into an outlet header 18 which is attached to the housing opposite the inlet header. Fluid from the outlet header 18 passes into the fluid outlet line 19 and thence to some service where a slurry of solids in air or liquid is desired. For example, the slurry may pass into a drill pipe as a circulating fluid for removing cuttings from the bottom of a hole. The entrained solids are available for dehydrating the air as it is exhausted from a drilling well or for coating the cuttings to prevent them from sticking or balling in the hole.

A fluid inlet port 14, a fluid outlet port 17, and a solids inlet port 21 in housing 13 are preferably in a single plane which is perpendicular to the axis of rotor 16 so that as the rotor is turned by a motor or other power means, not shown but connected to the spline 22, both ends of a receptacle 15 are intermittently in fluid communication with each of these ports.

A supply of bulk solids is maintained in a hopper 23 above the solids inlet ports 21 so that the solids are fed by gravity through a solids inlet port into a receptacle 15 when the rotor 16 is turned to a first position in which the receptacle is positioned vertically with the upper end and the solids inlet port in register. Since there is no port in the housing opposite the solids inlet ports, the receptacle, when it is in this vertical position, is thus filled by the flow of solids from the supply hopper. As the rotor 16 is rotated to a second position in which a receptacle is aligned or registers with both its fluid inlet port 14 and its fluid outlet port 17, these solids in the receptacle are displaced by the fluid flow through the fluid outlet port 17 into the outlet header 18 and thence into the fluid outlet line 19. By continued oscillation or rotation of the rotor 16, each receptacle is in turn returned to the first position in which it again registers at the upper end with the solids inlet port 21 and is again filled.

A pressure-relief port 24 is sometimes provided in the housing between a fluid inlet port 17 and a solids inlet port 21. By being approximately in the same plane as a receptacle 15 and the various ports with which this receptacle registers, one end of a receptacle is in communication with this pressure-relief port after the receptacle has been in fluid communication with the high-pressure fluid line and contains high-pressure fluid. This pressure-relief port thus permits the high-pressure fluid within the receptacle to be discharged into the atmosphere or other low-pressure area before the receptacle comes into fluid communication with the solids inlet port 21. By thus relieving the pressure in the receptacle, the solids in the hopper are not agitated by the countercurrent flow of the pressure fluid and flow directly into a receptacle when it registers with its solids inlet port.

It is generally desirable to maintain substantially constant flow of fluid through the high-pressure line in which the feeder is installed. Since the receptacles 15 are only intermittently in this fluid stream and flow therethrough is shut off when the receptacle is out of the unloading position, a fluid bypass is provided through which the fluid passes while flow through the receptacle is stopped. It is desirable, as indicated above, that the pressure fluid be directed through a receptacle when it is in unloading position to purge the solids therefrom. The bypass is therefore closed while a receptacle is in the fluid stream. Opening and closing of the bypass are thus synchronized with the rotation of rotor 16 and means for controlling flow through the bypass may, as indicated in the preferred embodiment, be built into the feeder 10 itself. One or more fluid bypasses or additional receptacles 25 in the rotor 16 are adapted to register intermittently with one or more additional fluid inlet ports 26 and corresponding fluid outlet ports (not shown) which are respectively in communication with the inlet header 12 and the outlet header 18. These additional receptacles are also placed preferably diametrically through the rotor with their axes rotated with respect to the axis of the solids-carrying receptacles 15 so that when a solids-carrying receptacle is in register with its fluid inlet port and fluid outlet port, additional bypasses or receptacles 25 are out of register with their respective fluid inlet ports and fluid outlet ports and so that when a solids-carrying receptacle 15 is out of register with its fluid inlet port and fluid outlet port, at least one of the additional recepacles is in register with its respective fluid inlet port and fluid outlet port. Flow of pressure fluid is thus not interrupted as the rotor is rotated, oscillated, or reciprocated between filling and emptying positions of the first receptacle. With only fluid inlet ports and fluid outlet ports and no solids inlet ports, the additional receptacles form bypasses which do not feed solids into the fluid stream and the solids are thus blended only intermittently with the fluids. Solids can thus, if desired, be fed either continuously or intermittently into the high-pressure fluid stream flowing between the fluid inlet line 11 and the fluid outlet line 19. The concentration of solids in the slurry as it leaves such a feeder can be varied by any of a number of means. It can be seen that the relative sizes of the various receptacles or solids inlet ports, the ratio of solids inlet ports to receptacles, and the like, can be varied as desired.

It can readily be seen that whereas the fluid bypass in the high-pressure line is, in the preferred embodiment, built right into the feeder itself, the bypass can be through a separate or external line connected at the inlet end to the fluid inlet line and at the downstream end to the fluid outlet line. In such case, any means for closing the bypass, e.g., a valve, can be actuated by the rotor or otherwise synchronized with the rotation of the rotor 16 so that when the rotor is in the position shown in the drawing with a solids receptacle in the unloading position, the bypass is closed to cause the high-pressure fluid to be directed through the receptacle to purge the solids therefrom and into the fluid outlet line 19. Similarly, the bypass can be opened synchronously as a solids-carrying receptacle is moved by the oscillation or rotation of the rotor 16 out of register with its fluid inlet and outlet ports. These and other modifications of this invention should, therefore, be construed to be a part of this invention and this invention should not, therefore, be construed to be limited to the illustrated embodiment. The invention instead should be construed to be limited only by the scope of the appended claims.

I claim:

1. An apparatus for injecting solids into a high-pressure fluids stream comprising, a housing, a solids inlet port in said housing, a fluid inlet line, a fluid inlet port in said housing in communication with said inlet line, a fluid outlet line, a fluid outlet port in said housing in communication with said outlet line, a rotor within and adapted to form a fluid seal with said housing, a first receptacle in and extending through said rotor, said first receptacle and said ports being so arranged that in a first position of said rotor, one end of said first receptacle is in register with said solids inlet port and in a second position of said rotor opposite ends of said first receptacle are simultaneously in register with said fluid inlet port and said fluid outlet port, means to move said rotor alternately between said first position and said second position to first fill said first receptacle and then to empty it into said high-pressure fluid stream through said outlet port, a high-pressure fluid bypass between said fluid inlet line and said fluid outlet line, and means to close said bypass when said rotor is in said second position whereby said fluid stream is directed through said first receptacle to displace said solids therefrom.

2. An apparatus according to claim 1 wherein said solids inlet port is located on the top of said housing including a hopper above and connected with said solids inlet port to feed said solids by gravity into said solids inlet port.

3. An apparatus according to claim 1 wherein said fluid bypass comprises at least one additional receptacle in and extending through said rotor, at least one additional fluid inlet port in said housing in communication with said inlet line, and at least one additional fluid outlet port in communication with said outlet line, each of said additional receptacles being adapted to register simultaneously with its respective additional fluid inlet port and fluid outlet port to form at least one fluid passage through said rotor between said inlet line and said outlet line only when said first receptacle is not in register with its respective fluid inlet port and fluid outlet port.

4. An apparatus according to claim 1 including a pressure-relief port in said housing between said fluid inlet port and said solids inlet port so that as said first receptacle moves from in register with said fluid inlet port to register with said solids inlet port it registers with said pressure-relief port to discharge high pressure fluid therein before said first receptacle registers with said solids inlet port.

5. An apparatus for injecting solids into a high-pressure fluid stream comprising, a cylindrical housing, at least one solids inlet port in said housing, a hopper for said solids above and in communication with said at least one solids inlet port to feed said solids through said at least one solids inlet port into said housing, a fluid inlet line, an inlet header to connect said inlet line to said housing, a multiplicity of fluid inlet ports in said housing to admit said pressure fluid stream from said inlet header into said housing, a fluid outlet line, an outlet header to connect said outlet line to said housing, a multiplicity of fluid outlet ports in said housing to exhaust said pressure fluid stream from said housing into said outlet header, a cylindrical rotor within and adapted to form a fluid seal with said housing, means to rotate said rotor in said housing, and a multiplicity of receptacles in and extending diametrically through said rotor, said at least one solids inlet port and each of said fluid inlet ports and said fluid outlet ports being positioned in said housing so that as said rotor is rotated in said housing said receptacles are intermittently in register with one each of said fluid inlet ports and said fluid outlet ports and at least one of said receptacles is then in register with said at least one solids inlet port, and so that as said rotor is rotated in said housing each of said receptacles serially registers with its respective fluid inlet port and fluid outlet port and the flow of said high-pressure fluid stream is substantially continuous and uninterrupted.

6. An apparatus according to claim 5 including a pressure-relief port in said housing between each of said fluid inlet ports and said at least one solids inlet port to exhaust the pressure from each of said receptacles after each of said receptacles is in communication with its respective fluid inlet port and before each of said receptacles is placed in communication with said hopper.

References Cited in the file of this patent

UNITED STATES PATENTS

| | | |
|---|---|---|
| 585,804 | Weber | July 6, 1897 |
| 1,020,743 | Burlingham et al. | Mar. 19, 1912 |